US009978500B2

(12) United States Patent
Sarkar

(10) Patent No.: US 9,978,500 B2
(45) Date of Patent: May 22, 2018

(54) YOKE CLAMP COMPONENT FOR A TRANSFORMER CORE

(71) Applicant: Virginia Transformer Corporation, Roanoke, VA (US)

(72) Inventor: Subhas Sarkar, Roanoke, VA (US)

(73) Assignee: Virginia Transformer Corporation, Roanoke, VA (US)

( * ) Notice: Subject to any disclaimer, the term of this patent is extended or adjusted under 35 U.S.C. 154(b) by 170 days.

(21) Appl. No.: 15/212,627

(22) Filed: Jul. 18, 2016

(65) Prior Publication Data

US 2018/0019048 A1 Jan. 18, 2018

(51) Int. Cl.

| | |
|---|---|
| ***H01F 27/06*** | (2006.01) |
| ***H01F 27/26*** | (2006.01) |
| ***F21V 21/00*** | (2006.01) |
| ***F16M 13/02*** | (2006.01) |
| ***H01F 27/02*** | (2006.01) |

(52) U.S. Cl.
CPC ......... *H01F 27/263* (2013.01); *H01F 27/022* (2013.01)

(58) Field of Classification Search
USPC ............... 336/210, 67, 68; 248/205.1, 227.3, 248/218.4–219.4
See application file for complete search history.

(56) References Cited

U.S. PATENT DOCUMENTS

| | | | | |
|---|---|---|---|---|
| 2,990,151 A * | 6/1961 | Phillips | F16L 3/24 | 211/107 |
| 3,436,707 A * | 4/1969 | Andersen | H01F 27/263 | 336/134 |
| 3,507,975 A * | 4/1970 | Scott | H01F 27/06 | 174/148 |
| 4,032,874 A * | 6/1977 | Kudlacik | H01F 27/245 | 336/134 |
| 5,240,216 A * | 8/1993 | Lin | E05D 15/38 | 16/94 R |
| 6,378,821 B1 * | 4/2002 | McKelvy | H02B 5/02 | 211/107 |
| 2004/0217836 A1 | 11/2004 | Archambault et al. | | |

FOREIGN PATENT DOCUMENTS

| | | |
|---|---|---|
| CN | 201773694 U | 3/2011 |
| CN | 201816978 U | 5/2011 |
| CN | 202564041 U | 11/2012 |
| FR | 2253381 A5 | 6/1975 |
| JP | 2010093104 A | 4/2010 |

* cited by examiner

*Primary Examiner* — Mangtin Lian
*Assistant Examiner* — Kazi Hossain
(74) *Attorney, Agent, or Firm* — Maier & Maier, PLLC

(57) ABSTRACT

A yoke clamp bracket for a transformer core. The yoke clamp bracket may comprise a body portion having a plurality of center holes near each end, a plurality of slots for coil barriers, a plurality of slots for wiring, and attachment points for side brackets and vertical supports. The yoke clamp bracket may be mounted to a transformer core by connectors extending through the plurality of center holes. The yoke clamp bracket may be constructed from a light-weight material with low density such that it displaces a larger quantity of tank oil and reduces the weight of a distribution transformer.

20 Claims, 4 Drawing Sheets

YOKE CLAMP COMPONENT FOR A TRANSFORMER CORE

BACKGROUND

Distribution transformers are used in AC power systems in order to convert high-voltage electricity carried by power lines to lower-voltage electricity that may be used by consumers. Several varieties of distribution transformer exist: pole-mounted transformers (mounted on a utility pole), ground-level pad-mounted transformers (generally mounted on a surface-level concrete pad), and underground transformers. These transformers may include, among other components, a core clamping structure that keeps the coils of the transformer in place.

These distribution transformers are legally required to meet efficiency standards set forth by the Department of Energy (DOE). Because of these requirements, and because of the demands of a competitive marketplace, it may generally be necessary to maintain stray losses in a given distribution transformer at as low a level as possible. Stray losses in a distribution transformer design can be caused by metallic structural components such as the transformer core clamps (typically made from mild steel), the tie plates, the transformer tank, and other similar metallic structural components.

Some of these components, such as the mild steel core clamps, may also add significant weight to the overall transformer. This may also be undesirable, especially in those cases where the distribution transformer is intended to be mounted on a utility pole; increased transformer weight may mean increased material and installation costs or increased risk of failure. As such, it is competitively very important to reduce both the sources of stray losses in a distribution transformer and the weight of the distribution transformer, so long as each can be done cost-effectively.

SUMMARY

A yoke clamp bracket for a transformer core may be disclosed. A yoke clamp bracket may comprise: a body portion, the body portion including a front and back face, a top and bottom face, and a left side and right side face disposed respectively at left and right ends of the body portion; the body portion further having a plurality of center holes disposed in close proximity to either end of the body portion, the plurality of center holes extending through the body portion in a direction perpendicular to the planes of the front face and the back face; the body portion further having a first coil barrier slot and a second coil barrier slot extending inward from the top face of the body portion, the first coil barrier slot being located at a point approximately equidistant from the second coil barrier slot and the left side face, the second coil barrier slot being located at a point approximately equidistant from the first coil barrier slot and the right side face; the body portion further having a plurality of vertical slots, each of the vertical slots extending inward from the bottom face of the body portion, and a plurality of horizontal slots, each of the horizontal slots extending inward from the front face of the body portion, wherein at least a vertical slot and a horizontal slot are located on each of the left and right sides of the first coil barrier slot and in close proximity to the first coil barrier slot, and wherein at least a vertical slot and a horizontal slot are located on each of the left and right sides of the second coil barrier slot and in close proximity to the second coil barrier slot; wherein the body portion is constructed from a substantially rigid, lightweight, and non-conductive material.

According to another exemplary embodiment, a transformer incorporating a plurality of yoke clamp brackets into its design may be disclosed. The transformer may comprise: a transformer core, the transformer core comprising a lower yoke and an upper yoke, and a plurality of transformer limbs, wherein each of the transformer limbs supports a transformer coil; a plurality of yoke clamps, each of the plurality of yoke clamps comprising a pair of yoke clamp brackets, wherein each of the yoke clamp brackets comprises: a body portion, the body portion including a front and back face, a top and bottom face, and a left side and right side face disposed respectively at left and right ends of the body portion; the body portion further having a plurality of center holes disposed in close proximity to either end of the body portion, the plurality of center holes extending through the body portion in a direction perpendicular to the planes of the front face and the back face; the body portion further having a first coil barrier slot and a second coil barrier slot extending inward from the top face of the body portion, the first coil barrier slot being located at a point approximately equidistant from the second coil barrier slot and the left side face, the second coil barrier slot being located at a point approximately equidistant from the first coil barrier slot and the right side face; the body portion further having a plurality of vertical slots, each of the vertical slots extending inward from the bottom face of the body portion, and a plurality of horizontal slots, each of the horizontal slots extending inward from the front face of the body portion, wherein at least a vertical slot and a horizontal slot are located on each of the left and right sides of the first coil barrier slot and in close proximity to the first coil barrier slot, and wherein at least a vertical slot and a horizontal slot are located on each of the left and right sides of the second coil barrier slot and in close proximity to the second coil barrier slot; wherein the body portion is constructed from a substantially rigid, lightweight, and non-conductive material; wherein a lower yoke clamp in the plurality of yoke clamps is coupled to the lower yoke of the transformer core; and wherein an upper yoke clamp in the plurality of yoke clamps is coupled to the upper yoke of the transformer core.

BRIEF DESCRIPTION OF THE FIGURES

Exemplary

Exemplary

Exemplary

Exemplary

Exemplary

DETAILED DESCRIPTION

Figure 1A:
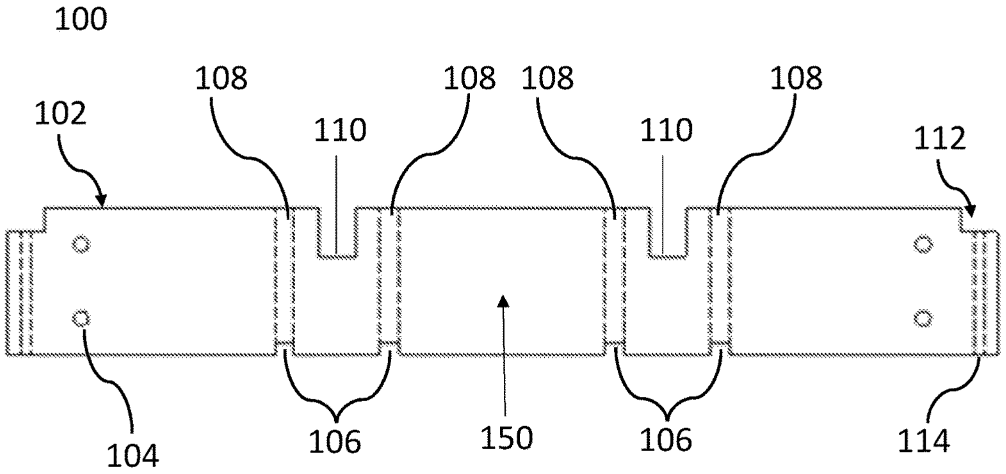
FIG. 1*a* shows a front view of an exemplary embodiment of a yoke clamp bracket for a transformer core.

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage or mode of operation.

According to an exemplary embodiment, and referring to the Figures generally, a yoke clamp bracket 100 for a transformer core may be provided. Such a yoke clamp bracket 100 may have a variety of uses inside the core of a transformer and in particular a distribution transformer. For example, according to one exemplary embodiment, the yoke clamp bracket 100 may be used in order to hold the core-yoke laminations together. According to another exemplary embodiment, the yoke clamp bracket 100 may be used in order to hold the core against the short circuit forces that may be found within the core of the distribution transformer or other transformer.

According to an exemplary embodiment, the body 102 of the yoke clamp bracket 100 may be constructed out of a material that is sufficiently strong to hold up to the forces inside the transformer. For a yoke clamp bracket 100 that is intended be employed in a distribution transformer, it may not be necessary to construct the body 102 out of a strong structural material, such as steel; instead, other materials, like other metals, plastics, and organic or inorganic composites may be used instead. Body 102 material may also be lightweight; according to some exemplary embodiments, the distribution transformer containing the yoke clamp bracket 100 may be suspended from a utility pole, and it may be desirable to reduce the weight of this distribution transformer as much as possible in order to make it easier to mount and simplify maintenance. According to some exemplary embodiments, body 102 material may also be inexpensive, or may be easy to work; this may ensure that the yoke clamp bracket 100 can be created inexpensively, increasing its attractiveness as a design.

For example, according to one exemplary embodiment, the body 102 of the yoke clamp bracket 100 may be constructed out of wood. Different types of wood may be used for the body 102; for example, a hardwood, such as oak or maple, may be used. Different preparations of wood may also be used; for example, the wood may be plywood, or may be another composite wood or engineered wood. Materials other than wood may also be used; for example, the body 102 may be constructed from a wood-like material such as engineered bamboo, or from an inorganic composite material, or from any other acceptable material, as desired.

According to an exemplary embodiment, constructing the yoke clamp bracket 100 from a non-conducting material, such as wood, may reduce or eliminate the electrical clearances that may be required within a distribution transformer. For example, no electrical clearances may be required to be maintained from the current carrying lead, or other leads, to the wooden yoke clamp bracket 100. According to an exemplary embodiment, wooden yoke clamp bracket 100 may be used as a support for the current-carrying leads, or may be used as a routing base for the leads, as desired.

Similarly, a yoke clamp bracket 100 being constructed from wood or a wooden composite, or another non-conductive and/or non-magnetically-permeable material, may reduce stray losses within the distribution transformer as compared to the use of a steel yoke clamp, as no eddy currents may be induced in the yoke clamp bracket 100.

The use of a wooden or otherwise non-conductive yoke clamp bracket 100 may also allow for higher current densities to be used in the electrical design, which may have numerous advantages. In particular, a higher current density may allow for the sizes of the transformer cores and coils to be reduced, which may in turn allow for reductions in the size of the tank necessary to accommodate the transformer cores and coils, and the amount of oil that is required to fill the smaller tank. It may also allow for reductions in the coil and core weight, which may in turn place less stress on the transformer mounting bracket and on the pole. This may result in general cost reductions for the transformer.

According to an exemplary embodiment, yoke clamp bracket 100 may be retrofittable. Yoke clamp bracket 100 may be sized and shaped such that, when an existing transformer is undergoing inspection or refurbishment, yoke clamp bracket 100 may be installed in the existing design of transformer, if desired. According to another exemplary embodiment, yoke clamp bracket 100 may be applied to new transformers. According to an exemplary embodiment, yoke clamp bracket 100 may also be easy to remove and replace, if desired.

According to an exemplary embodiment, yoke clamp bracket 100 may be easy to modify. Another advantage of using a softer and less expensive material, like wood, to construct the yoke clamp bracket 100 may be that the material may be easily modified and cut to shape, if necessary and if desired. According to an exemplary embodiment, a yoke clamp bracket 100 that is easier to modify may likewise be more worker-friendly.

Yoke clamp bracket 100 may have a plurality of center holes 104 or mounting holes on or near either end of the yoke clamp bracket 100. Center holes 104 may be used in order to secure the yoke clamp bracket 100 on a transformer core. For example, according to one exemplary embodiment, a yoke clamp bracket 100 may be placed on either side of the lower (or upper) portion of a transformer core, and a plurality of small rods, bolts, or other connectors may be passed through the center holes 104 in order to secure one of the yoke clamp brackets 100 to the other and secure the transformer core in place. According to an exemplary embodiment, small rods or other connectors may be non-conductive, and may be, for example, constructed from nylon, or another material, as desired. According to an exemplary embodiment, small rods or other connectors may be passed through the center holes 104 and into the transformer core. According to an alternative exemplary embodiment, small rods may be passed through the center holes 104 and around the transformer core into another pair of center holes 104 of a yoke clamp bracket 100 mounted on the opposite side of the transformer core.

Yoke clamp bracket 100 may also have a plurality of slots, including vertical slots 106 and horizontal slots 108. According to an exemplary embodiment, vertical slots 106 and horizontal slots 108 may be used as guides for a strap or other connector that may be used to attach the yoke clamp bracket 100 to the transformer core. According to another exemplary embodiment, vertical slots 106 and horizontal slots 108 may be used as guides for transformer coil wire.

According to an exemplary embodiment wherein the yoke clamp bracket 100 is intended to be attached to a transformer core having at least three limbs, vertical slots 106 and horizontal slots 108 may be located at points at or near ⅓ of the span of the yoke clamp bracket 100 and ⅔ of the span of the yoke clamp bracket 100. Such a configuration may split the yoke clamp bracket 100 into three sections of approximately equal length. According to an exemplary embodiment, when the yoke clamp bracket 100 is installed on a transformer core, the vertical slots 106 and horizontal slots 108 may be located at points at or near the spaces between transformer core limbs and/or transformer coils. Other placements of vertical slots 106 and/or horizontal slots 108 may also be envisioned, as desired.

Yoke clamp bracket 100 may also have a plurality of coil barrier slots 110. Coil barrier slots 110 may be used to support a barrier placed between transformer coils, such as an insulating or dielectric barrier, or other barrier, as desired. An edge of the coil barrier may fit in the coil barrier slots 110, substantially fixing the coil barrier in place in a position that separates adjacent transformer coils. According to an exemplary embodiment, coil barrier 110 may be formed from a solid insulating material, such as pressboard, densified or "transformer" wood, another type of wood such as maple or beech wood, or another material such as layer insulation, as desired.

Yoke clamp bracket 100 may also have a side bracket support 112, which may be used to support a side bracket. According to an exemplary embodiment, side bracket may fit onto or otherwise attach to the yoke clamp bracket 100 at the side bracket support, and may extend to another yoke clamp bracket 100 that may be placed on the other side of a transformer core. This may be used, for example, to secure the yoke clamp bracket 100 in place around the transformer core.

According to an exemplary embodiment, yoke clamp bracket 100 may have a vertical through hole, called a drawdown channel 114, disposed near each end of the yoke clamp bracket 100. According to an exemplary embodiment, drawdown channel 114 may extend through the yoke clamp bracket 100. Drawdown channel 114 may be used to, for example, support a tie plate; according to such an exemplary embodiment, tie plate may extend from one yoke clamp bracket on one side of the core, across the top or bottom of the core and to a yoke clamp bracket 100 on the other side of the hole. According to such an exemplary embodiment, drawdown channel 114 may accommodate a connector, such as a bolt, which may be passed through the tie plate and the drawdown channel 114 and used to hold both in place relative to each other. According to an exemplary embodiment, the tie plate may be welded to the core; according to such an embodiment, the drawdown channel 114 may also serve to connect the yoke clamp bracket 114 to the core.

Referring now to exemplary FIG. 1*a*, FIG. 1*a* shows a front view of an exemplary embodiment of a yoke clamp bracket 100 for a transformer core. The face of the yoke clamp bracket 100 shown in FIG. 1*a* may be referred to as the "front" face 150 of the yoke clamp bracket 100, with the opposite side being the "back" face.

Figure 1B:
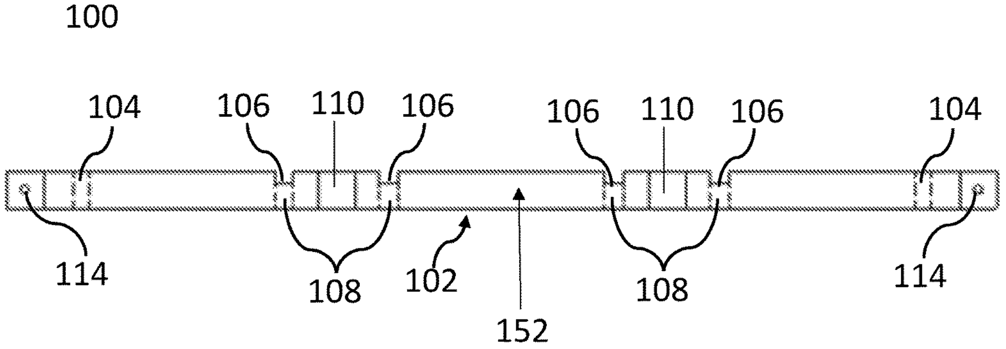
FIG. 1*b* shows a top view of an exemplary embodiment of a yoke clamp bracket for a transformer core.

Referring now to exemplary FIG. 1*b*, FIG. 1*b* shows a top view of an exemplary embodiment of a yoke clamp bracket 100 for a transformer core. The face of the yoke clamp bracket 100 shown in FIG. 1*b* may be referred to as the "top" face 152 of the yoke clamp bracket 100, with the opposite side being the "bottom" face.

Figure 1C:
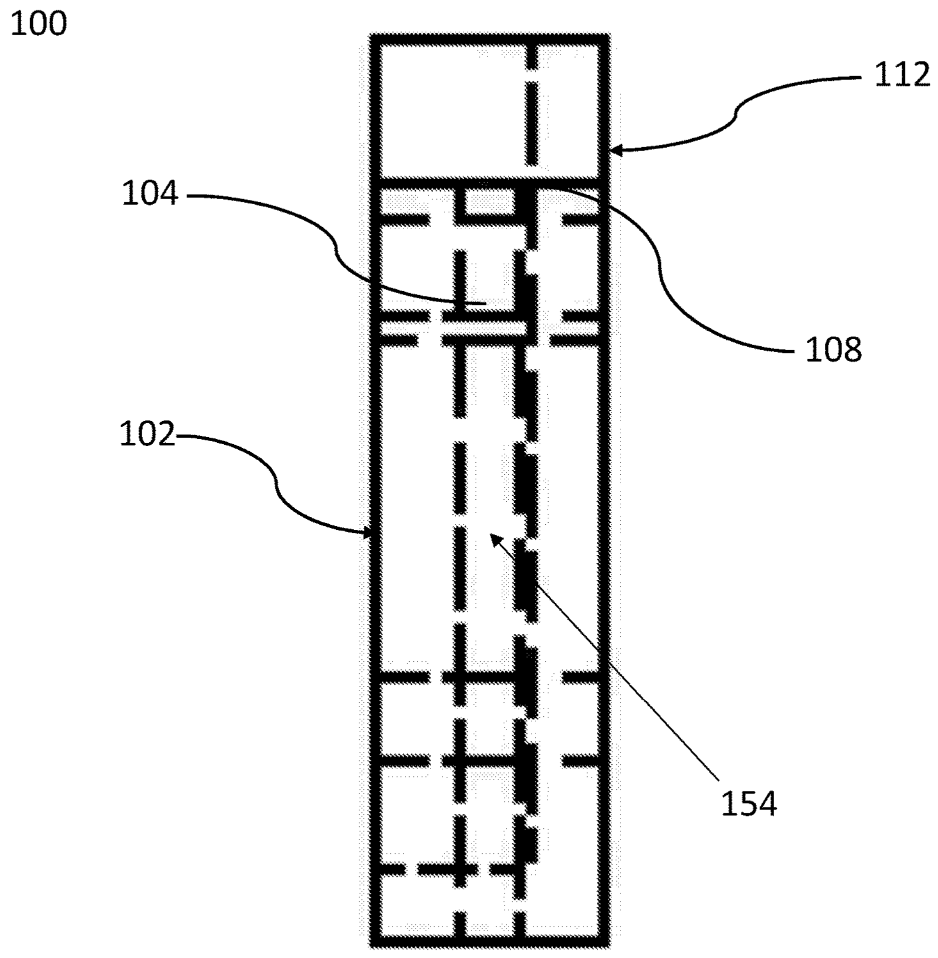
FIG. 1*c* shows a side view of an exemplary embodiment of a yoke clamp bracket for a transformer core.

Referring now to exemplary FIG. 1*c*, FIG. 1*c* shows a top view of an exemplary embodiment of a yoke clamp bracket 100 for a transformer core. The face of the yoke clamp bracket 100 shown in FIG. 1*c* may be referred to as the "side" or "left side" face 154 of the yoke clamp bracket 100, with the opposite side being the "right side" face.

Figure 1D:
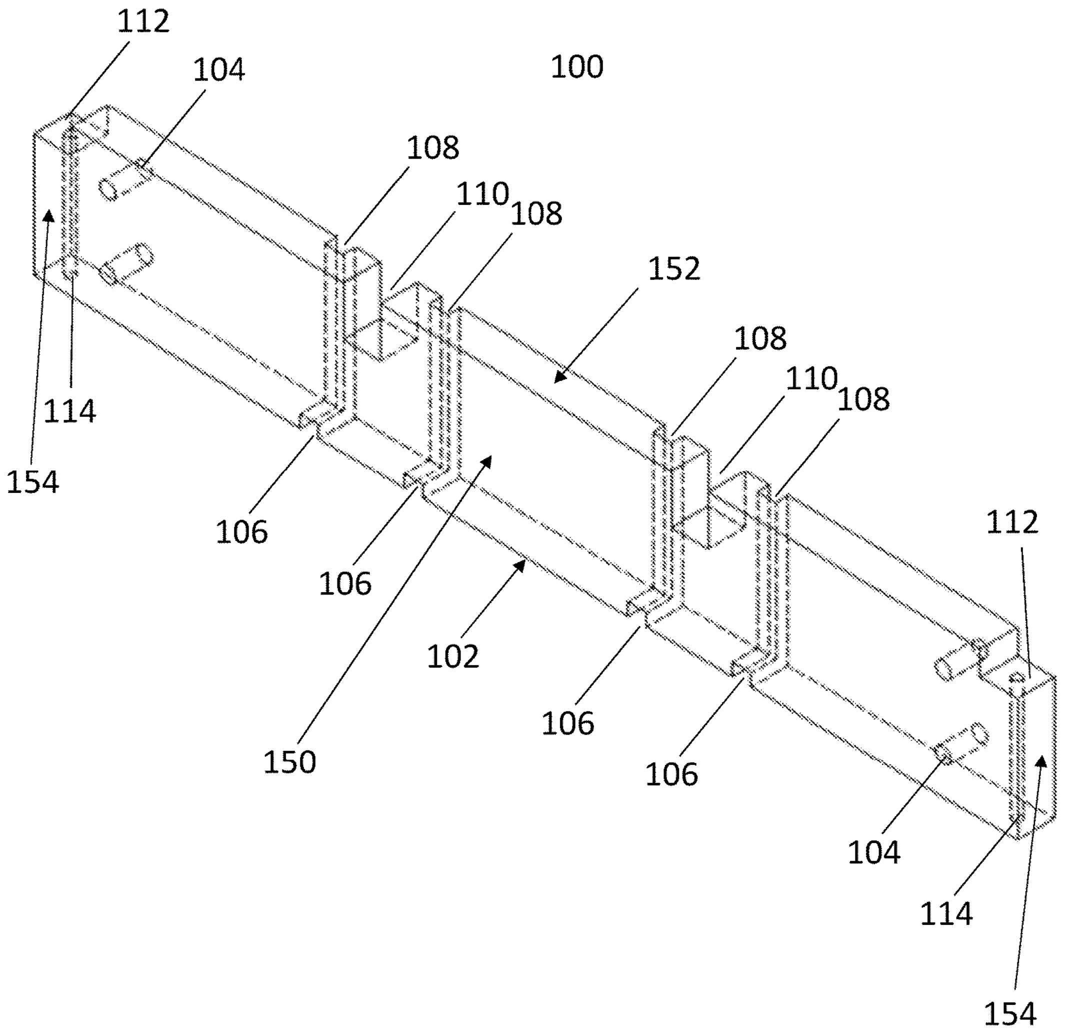
FIG. 1*d* shows an isometric view of an exemplary embodiment of a yoke clamp bracket for a transformer core.

Referring now to exemplary FIG. 1*d*, FIG. 1*d* shows an isometric view of an exemplary embodiment of a yoke clamp bracket 100 for a transformer core. The isometric view of the yoke clamp bracket 100 shown in FIG. 1*d* may show front 150, top 152, and side 154 faces of the yoke clamp bracket 100.

Figure 2:
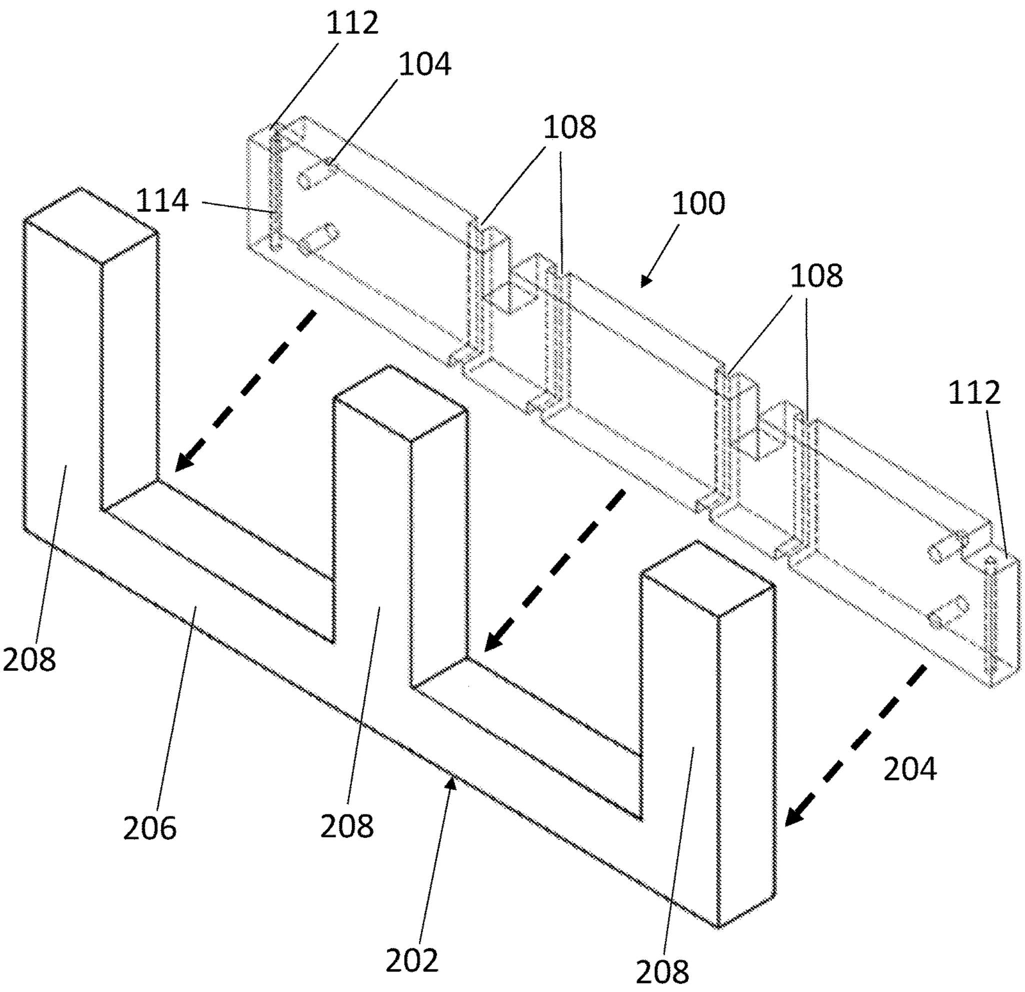
FIG. 2 shows an isometric view of an exemplary embodiment of a yoke clamp bracket as applied to a transformer core.

Turning now to exemplary FIG. 2, FIG. 2 displays an exemplary embodiment of a transformer core 202 to which a yoke clamp bracket 100 may be fitted 204. Transformer core 202 may include a yoke 206 and a number of limbs 208. According to an exemplary embodiment, yoke clamp bracket 100 may be slightly longer than the yoke 206, such that the center holes 104 extend past the ends of the yoke 206 on either side. Side bracket may likewise be attached to a side bracket support 112 extending past the end of the yoke 206. According to an exemplary embodiment, bolts or other connectors may extend through the center holes 104, through the side bracket, and out the center holes 104 of a yoke clamp bracket 100 mounted on the opposite side of the transformer core 202. According to an alternative exemplary embodiment, bolts or other connectors may be passed into the transformer core 202, as desired.

According to an exemplary embodiment, a "yoke clamp" may include two yoke clamp brackets 100, each yoke clamp bracket 100 being located on one side of a transformer yoke 206, and each yoke clamp bracket 100 being linked to the other yoke clamp bracket 100 by a pair of side brackets, each of which is attached to one of the side bracket supports 112 of each yoke clamp bracket 100. Yoke clamp brackets 100 may further be coupled to a transformer yoke 206, for example via the mounting holes. According to another exemplary embodiment, a "yoke clamp" may include only a pair of yoke clamp brackets 100, each of which is coupled via bolts to the transformer yoke 206 rather than being coupled to a side bracket.

According to an exemplary embodiment, transformer limbs 208 may terminate in another yoke 206 (an "upper yoke"), to which may be attached another pair of yoke clamp brackets 100. Upper yoke may be similar or identical in size and shape to the lower yoke 206. Yoke clamp brackets 100 attaching to the upper yoke of the transformer core 202 may be substantially identical to yoke clamp brackets 100 attaching to the lower yoke 206 of the transformer core 202, or may have a different geometry, as desired. Yoke clamp brackets 100 attaching to either the upper or lower yoke 206 of the transformer core may have vertical through holes 114 on either end of the span of the yoke clamp bracket 100; vertical through holes may be substantially vertically-facing and may extend through or substantially through the yoke clamp bracket 100. Vertical supports may be fitted in the vertical through holes 114 and may extend upward from the yoke clamp brackets 100 attaching to the lower yoke 206 of the transformer core 202 to the yoke clamp brackets 100 attaching to the upper yoke of the transformer core. Alternatively, vertical supports may extend to another point, or vertical through holes 114 may be used to fit another shape or type of support, as desired.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art (for example, features associated with certain configurations of the invention may instead be associated with any other configurations of the invention, as desired).

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A yoke clamp bracket for a transformer core, comprising:

a body portion, the body portion including a front and back face, a top and bottom face, and a left side and right side face disposed respectively at left and right ends of the body portion;

the body portion further having a plurality of center holes disposed in close proximity to either end of the body portion, the plurality of center holes extending through the body portion in a direction perpendicular to each of the plane of the front face and the back face;

the body portion further having a first coil barrier slot and a second coil barrier slot extending inward from the top face of the body portion, the first coil barrier slot being located at a point approximately equidistant from the second coil barrier slot and the left side face, the second coil barrier slot being located at a point approximately equidistant from the first coil barrier slot and the right side face;

the body portion further having a plurality of vertical slots, each of the vertical slots extending inward from the bottom face of the body portion, and a plurality of horizontal slots, each of the horizontal slots extending inward from the front face of the body portion, wherein at least a vertical slot and a horizontal slot are located on each of the left and right sides of the first coil barrier slot and in close proximity to the first coil barrier slot, and wherein at least a vertical slot and a horizontal slot are located on each of the left and right sides of the second coil barrier slot and in close proximity to the second coil barrier slot;

wherein the body portion is constructed from a substantially rigid, lightweight, and non-conductive material.

2. The yoke clamp bracket of claim 1, wherein the body portion is constructed from wood.

3. The yoke clamp bracket of claim 1, wherein the body portion is constructed from a material that is workable by hand tools.

4. The yoke clamp bracket of claim 1, wherein the body portion is constructed from a material that has a low magnetic permeability.

5. The yoke clamp bracket of claim 1, further comprising:

the body portion further having at least one side bracket support disposed on the left end of the body portion, and at least one side bracket support disposed on the right end of the body portion, each of the side bracket supports comprising a recessed corner of the body portion.

6. The yoke clamp bracket of claim 1, further comprising:

the body portion further having a vertical through hole disposed in close proximity to the left end of the body portion and extending inward from the top face of the body portion, and a vertical through hole disposed in close proximity to the right end of the body portion and extending inward from the top face of the body portion.

7. The yoke clamp bracket of claim 1, wherein the yoke clamp bracket provides support to a current-carrying lead.

8. The yoke clamp bracket of claim 7, wherein the yoke clamp bracket directly supports a current-carrying lead such that no electrical clearance is required between the yoke clamp bracket and the current-carrying lead.

9. The yoke clamp bracket of claim 1, wherein the yoke clamp bracket is used as a routing base for a current-carrying lead.

10. A distribution transformer, comprising:

a transformer core, the transformer core comprising a lower yoke and an upper yoke, and a plurality of transformer limbs, wherein each of the transformer limbs supports a transformer coil;

a plurality of yoke clamps, each of the plurality of yoke clamps comprising a pair of yoke clamp brackets, wherein each of the yoke clamp brackets comprises:

a body portion, the body portion including a front and back face, a top and bottom face, and a left side and right side face disposed respectively at left and right ends of the body portion;

the body portion further having a plurality of center holes disposed in close proximity to either end of the body portion, the plurality of center holes extending through the body portion in a direction perpendicular to each of the plane of the front face and the back face;

the body portion further having a first coil barrier slot and a second coil barrier slot extending inward from the top face of the body portion, the first coil barrier slot being located at a point approximately equidistant from the second coil barrier slot and the left side face, the second coil barrier slot being located at a point approximately equidistant from the first coil barrier slot and the right side face;

the body portion further having a plurality of vertical slots, each of the vertical slots extending inward from the bottom face of the body portion, and a plurality of horizontal slots, each of the horizontal slots extending inward from the front face of the body portion, wherein at least a vertical slot and a horizontal slot are located on each of the left and right sides of the first coil barrier slot and in close proximity to the first coil barrier slot, and wherein at least a vertical slot and a horizontal slot are located on each of the left and right sides of the second coil barrier slot and in close proximity to the second coil barrier slot;

wherein the body portion is constructed from a substantially rigid, lightweight, and non-conductive material;

wherein a lower yoke clamp in the plurality of yoke clamps is coupled to the lower yoke of the transformer core; and wherein an upper yoke clamp in the plurality of yoke clamps is coupled to the upper yoke of the transformer core.

11. The distribution transformer of claim 10, wherein:

each of the pair of yoke clamp brackets of the lower yoke clamp is coupled to the other yoke clamp bracket of the lower yoke clamp by a plurality of rods, each rod in the plurality of rods extending through a center hole in the plurality of center holes of a yoke clamp bracket of the lower yoke clamp; and wherein each of the pair of yoke clamp brackets of the upper yoke clamp is coupled to the other yoke clamp bracket of the upper yoke clamp by a plurality of rods, each rod in the plurality of rods extending through a center hole in the plurality of center holes of a yoke clamp bracket of the upper yoke clamp.

12. The distribution transformer of claim 10, wherein the transformer is a 5 MVA transformer.

13. The distribution transformer of claim 10, further comprising:

a transformer casing, the transformer casing comprising a hollow body;

wherein the transformer core and the plurality of yoke clamps are fully enclosed within the transformer casing; and wherein the transformer casing is filled with non-conductive oil.

14. The distribution transformer of claim 13, wherein each of the yoke clamp brackets is constructed from a material having a low density.

15. The distribution transformer of claim 10, further comprising:

a plurality of coil barriers, each coil barrier being constructed from an insulating material;

wherein a first coil barrier in the plurality of coil barriers is mounted in the lower yoke clamp at the first coil barrier slot of the lower yoke clamp, and mounted in the upper yoke clamp at the first coil barrier slot of the upper yoke clamp; and wherein a second coil barrier in the plurality of coil barriers is mounted in the lower yoke clamp at the second coil barrier slot of the lower yoke clamp, and mounted in the upper yoke clamp at the second coil barrier slot of the upper yoke clamp.

16. The distribution transformer of claim 10, wherein each of the yoke clamp brackets further comprises:

the body portion further having at least one side bracket support disposed on the left end of the body portion, and at least one side bracket support disposed on the right end of the body portion, each of the side bracket supports comprising a recessed corner of the body portion.

17. The distribution transformer of claim 16, wherein each of the yoke clamps in the plurality of yoke clamps further comprises a plurality of side brackets, each of the side brackets extending vertically and having a top end and a bottom end, the top ends of each side bracket being mated to a plurality of side bracket supports of an upper yoke clamp and the bottom ends of each side bracket being mated to a plurality of side bracket supports of a lower yoke clamp.

18. The distribution transformer of claim 10, wherein each of the yoke clamp brackets further comprises:

the body portion further having a vertical through hole disposed in close proximity to the left end of the body portion and extending inward from the top face of the body portion, and a vertical through hole disposed in close proximity to the right end of the body portion and extending inward from the top face of the body portion.

19. The distribution transformer of claim 18, further comprising:

a plurality of top tie plates, each of the top tie plates extending from one of the pair of yoke clamp brackets of the upper yoke clamp to the other of the pair of yoke clamp brackets of the upper yoke clamp, each top tie plate being connected to each of the pair of yoke clamp brackets of the upper yoke clamp by a connector disposed in a vertical through hole of each of the pair of yoke clamp brackets of the upper yoke clamp; and a plurality of bottom tie plates, each of the bottom tie plates extending from one of the pair of yoke clamp brackets of the lower yoke clamp to the other of the pair of yoke clamp brackets of the lower yoke clamp, each bottom tie plate being connected to each of the pair of yoke clamp brackets of the lower yoke clamp by a connector disposed in a vertical through hole of each of the pair of yoke clamp brackets of the lower yoke clamp.

20. The distribution transformer of claim 10, wherein each of the yoke clamp brackets is constructed from wood.

* * * * *